US012447597B2

(12) United States Patent
Beer

(10) Patent No.: US 12,447,597 B2
(45) Date of Patent: Oct. 21, 2025

(54) OFFSET IMPACT MECHANISM FOR A HAMMER TOOL

(71) Applicant: Snap-on Incorporated, Kenosha, WI (US)

(72) Inventor: Joshua M. Beer, Kenosha, WI (US)

(73) Assignee: Snap-on Incorporated, Kenosha, WI (US)

( * ) Notice: Subject to any disclaimer, the term of this patent is extended or adjusted under 35 U.S.C. 154(b) by 53 days.

(21) Appl. No.: 18/408,083

(22) Filed: Jan. 9, 2024

(65) Prior Publication Data

US 2024/0139927 A1 May 2, 2024

Related U.S. Application Data

(63) Continuation of application No. 17/239,989, filed on Apr. 26, 2021, now Pat. No. 11,945,084.

(51) Int. Cl.
*B25D 11/00* (2006.01)
*B25D 11/06* (2006.01)
*B25D 11/10* (2006.01)

(52) U.S. Cl.
CPC ............ *B25D 11/10* (2013.01); *B25D 11/066* (2013.01)

(58) Field of Classification Search
CPC ....... B25D 11/068; B25D 11/04; B25D 11/06; B25D 11/10
USPC .............. 173/121, 117, 205, 452.7, 170, 115
See application file for complete search history.

(56) References Cited

U.S. PATENT DOCUMENTS 1,738,207 A 12/1929 Riggs
1,770,656 A 7/1930 Nielsen
1,860,826 A * 5/1932 Tschudi ................ B25D 11/10 173/205
1,887,980 A 11/1932 Martin
2,094,184 A 9/1937 Noble
(Continued)

FOREIGN PATENT DOCUMENTS

CN 201271876 Y 7/2009
CN 201604135 U 10/2010
(Continued)

OTHER PUBLICATIONS

UK Intellectual Property Office, Examination Report issued in corresponding Application No. GB2407149.0, dated Oct. 16, 2024, 6 pp.

(Continued)

*Primary Examiner* — Jacob A Smith
(74) *Attorney, Agent, or Firm* — Taft Stettinius & Hollister LLP

(57) ABSTRACT

An impact mechanism for an impact tool having a housing with a housing longitudinal axis, wherein the impact mechanism includes an impact mechanism longitudinal axis that is offset and substantially perpendicular to the housing longitudinal axis. The impact mechanism includes a gear carrier adapted to be driven by a motor of the impact tool to rotate about the impact mechanism longitudinal axis, a hammer slidably coupled to the gear carrier and rotatable about the impact mechanism longitudinal axis, the hammer includes a radial surface with a hammer lug extending therefrom, and an intermediate bit adapted to receive impact force from the hammer lug and transfer impact force to a tool bit.

16 Claims, 5 Drawing Sheets

(56) References Cited

U.S. PATENT DOCUMENTS

| | | | | |
|---|---|---|---|---|
| 2,461,571 | A | 2/1949 | Robinson | |
| 3,480,089 | A | 11/1969 | Gordon et al. | |
| 4,174,113 | A | 11/1979 | Eckman | |
| 5,025,869 | A * | 6/1991 | Terunuma | B25D 11/04 173/98 |
| 7,789,282 | B2 | 9/2010 | Chen et al. | |
| 8,256,527 | B2 | 9/2012 | Wu | |
| 8,297,373 | B2 * | 10/2012 | Elger | B25C 5/15 173/100 |
| 8,308,039 | B2 | 11/2012 | Wei | |
| 8,342,375 | B2 | 1/2013 | Chen et al. | |
| 8,348,120 | B2 | 1/2013 | Wei | |
| 8,424,734 | B2 | 4/2013 | Zhou | |
| 8,469,250 | B2 | 6/2013 | Zhou | |
| RE44,344 | E | 7/2013 | Chen et al. | |
| 8,479,965 | B2 | 7/2013 | Chen | |
| 8,485,276 | B2 | 7/2013 | Wei | |
| 8,596,512 | B2 | 12/2013 | Wei et al. | |
| 8,978,951 | B2 | 3/2015 | Wei | |
| 9,199,389 | B2 | 12/2015 | Myrhum, Jr. et al. | |
| 2002/0050365 | A1 | 5/2002 | Bongers et al. | |
| 2009/0020299 | A1 | 1/2009 | Manschitz et al. | |
| 2011/0011912 | A1 | 1/2011 | Wei et al. | |
| 2011/0094764 | A1 | 4/2011 | Wei | |
| 2011/0100662 | A1 | 5/2011 | Wei | |
| 2014/0054057 | A1 | 2/2014 | Ludy et al. | |
| 2014/0262398 | A1 | 9/2014 | Bailey, Jr. et al. | |
| 2015/0174744 | A1 | 6/2015 | Scott et al. | |
| 2017/0144287 | A1 | 5/2017 | Fischer | |
| 2017/0252915 | A1 | 9/2017 | Furusawa et al. | |
| 2018/0297185 | A1 | 10/2018 | Schaub et al. | |
| 2019/0232478 | A1 | 8/2019 | Zawisza et al. | |
| 2020/0391369 | A1 | 12/2020 | Furusawa et al. | |

FOREIGN PATENT DOCUMENTS

| | | | |
|---|---|---|---|
| CN | 102672681 | A | 9/2012 |
| CN | 110625574 | A | 12/2019 |
| DE | 311832 | | 10/1917 |
| DE | 1652525 | | 4/1971 |
| EP | 2777886 | A2 | 9/2014 |
| EP | 3479965 | A1 | 5/2019 |
| GB | 279532 | | 10/1927 |
| GB | 441256 | A | 1/1936 |
| GB | 1102888 | | 2/1968 |
| GB | 2475387 | A | 5/2011 |
| JP | 2010535642 | A | 11/2010 |
| JP | 2020199606 | A | 12/2020 |
| TW | 201836789 | A | 10/2018 |
| TW | I644765 | B | 12/2018 |
| WO | 2020135184 | A1 | 7/2020 |
| WO | 2022159471 | A1 | 7/2022 |

OTHER PUBLICATIONS

UK Intellectual Property Office, Combined Search and Examination Report issued in corresponding Application No. GB2407149.0, dated Jun. 7, 2024, 7 pp.

Canadian Patent Office, Examination Report issued in corresponding Application No. 3,154,498, dated Jun. 13, 2024, 4 pp.

Australian Patent Office, Examination Report No. 1 issued in corresponding Application No. 2024201639, dated Apr. 11, 2025, 4 pp.

United Kingdom Intellectual Property Office, Examination Report issued in corresponding Application No. GB2306496.7, dated Mar. 20, 2024, 7 pp.

Examination Report for corresponding Application No. GB2204904.3 dated Jun. 29, 2023, 5 pages.

Examination Report No. 1 for corresponding Application No. 2022202489 dated Jun. 22, 2023, 7 pages.

Canadian Office Action for corresponding Application No. 3,154,498 dated Jun. 22, 2023, 4 pages.

United Kingdom Combined Search and Examination Report for corresponding UK Application No. GB2204904.3 dated Sep. 26, 2022, 7 pages.

Taiwan Office Action for corresponding TW Application No. 1111157433 dated Oct. 11, 2022, 15 pages.

UK Intellectual Property Office, Examination Report issued in corresponding Application No. GB2407149.0, dated Jan. 24, 2025, 8 pp.

Chinese Patent Office, First Office Action issued in corresponding Application No. 202210431260.9, dated 1 Mar. 7, 2025, 13 pp.

Chinese Patent Office, Second Office Action issued in corresponding Application No. 202210431260.9, dated Jul. 23, 2025, 11 pp.

UK Intellectual Property Office, Examination Report issued in corresponding Application No. GB2407149.0, dated Aug. 14, 2025, 6 pp.

* cited by examiner

OFFSET IMPACT MECHANISM FOR A HAMMER TOOL

CROSS REFERENCES TO RELATED APPLICATIONS

This application is a continuation of, and claims the benefit to, U.S. patent application Ser. No. 17/239,989, filed Apr. 26, 2021, the content of which is incorporated herein by reference in its entirety.

TECHNICAL FIELD

The present application relates generally to impact mechanisms for impact hammer tools, and more particularly to an offset impact mechanism for a powered impact hammer tool.

BACKGROUND

A variety of powered hammer tools, such as, for example, nail guns, demolition hammers, jack hammers, rotary hammers, auto hammers, etc. are commonly used to apply repetitive force to a tool bit, such as, for example, a hammer bit, or fastener, such as, for example, a nail. The force delivered to the tool bit can be used to break up stone, cut through metal, or shape metal, for example. One such tool, known as an air hammer, is commonly used to break up and/or cut metal and/or stone.

Air hammers typically use compressed air to power a piston that creates an impact force that is applied to a tool bit designed for chiseling, cutting, and shaping metal and/or stone. These air hammer tools require a continuous supply of compressed air to operate. Accordingly, these tools are limited for use in worksites with compressed air.

Another tool used to deliver force to a tool bit is a nail gun. While this conventional tool utilizes an impact mechanism that can be driven by a battery powered motor, the impact mechanism in these conventional tools do not provide sufficient impact force to chisel, cut, and shape metal and/or stone.

Other conventional tools utilize an electric powered impact mechanism to deliver force to tool bits. While these conventional tools utilize battery powered motors, the impact mechanisms fail to deliver enough impact force to chisel, cut, and shape metal and/or stone.

SUMMARY

The present invention relates broadly to an impact mechanism for an impact hammer tool powered by electricity via an external power source (such as a wall outlet and/or generator outlet) or a battery, such as, for example, an 18 V battery. The impact mechanism includes an impact mechanism longitudinal axis that is a perpendicular and offset relative to a tool longitudinal axis. The impact mechanism includes a hammer having a number of radially protruding impact surfaces adapted to impact an intermediate bit that is constrained to a small linear motion inside the tool housing. The intermediate bit is then adapted to impact a conventional hammer bit.

The intermediate bit ensures that the hammer bit is far enough away from the impact mechanism to allow free movement, while still generating enough rotational inertia to generate a large impacting force. The hammer is driven by a gear carrier that is operably coupled to a motor. The hammer and the gear carrier respectively include a ball groove. In an embodiment, the ball groove of the hammer and the ball groove of the gear carrier are limited to use in one rotary direction. Unlike conventional impact mechanisms that require a continuous supply of compressed air to generate sufficient force, the present invention provides an impact mechanism powered by an electric power source, such as, for example, a rechargeable battery, that can provide sufficient impact force.

In an embodiment, the present invention broadly comprises an impact mechanism for an impact tool. The impact mechanism includes a housing longitudinal axis. The impact mechanism includes an impact mechanism longitudinal axis that is offset and substantially perpendicular to the housing longitudinal axis. The impact mechanism comprising a gear carrier adapted to be driven by a motor of the impact tool to rotate about the impact mechanism longitudinal axis, a hammer slidably coupled to the gear carrier and rotatable about the impact mechanism longitudinal axis, the hammer includes a radial surface with a hammer lug extending therefrom, and an intermediate bit adapted to receive impact force from the hammer lug and transfer impact force to a tool bit.

In another embodiment, the present invention broadly comprises an impact tool including a housing with a housing longitudinal axis and a motor. The impact tool comprises an impact mechanism having an impact mechanism longitudinal axis that is offset and substantially perpendicular to the housing longitudinal axis. The impact mechanism including a gear carrier adapted to be driven by the motor to rotate about the impact mechanism longitudinal axis, a hammer slidably coupled to the gear carrier and rotatable about the impact mechanism longitudinal axis, the hammer includes a radial surface with a hammer lug extending therefrom, and an intermediate bit slidably disposed in a bore of the housing and adapted to receive impact force from the hammer lug and transfer impact force to a tool bit.

In another embodiment, the present invention broadly comprises an impact hammer comprising a housing having a housing longitudinal axis, a motor, and an impact mechanism. The impact mechanism having an impact mechanism longitudinal axis that is offset and substantially perpendicular to the housing longitudinal axis. The impact mechanism including a gear carrier adapted to be driven by the motor to rotate about the impact mechanism longitudinal axis, a hammer slidably coupled to the gear carrier and rotatable about the impact mechanism longitudinal axis, the hammer includes a radial surface with hammer lugs extending therefrom, and an intermediate bit slidably disposed in a bore of the housing and adapted to receive impact force from the hammer lug and transfer impact force to a tool bit.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION

Figure 1:
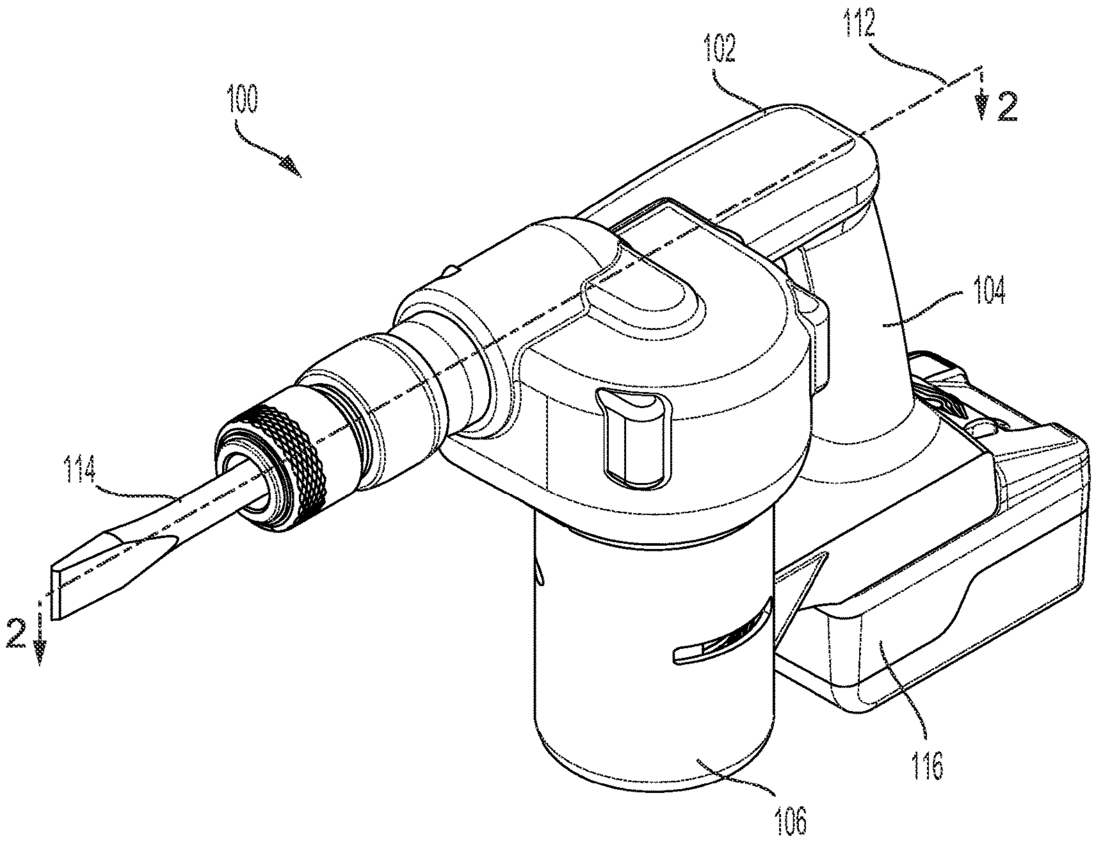
FIG. 1 is a perspective view of a hammer tool, incorporating an impact mechanism according to an embodiment of the present invention.

While this invention is susceptible of embodiments in many different forms, there is shown in the drawings, and will herein be described in detail, a preferred embodiment of the invention with the understanding that the present disclosure is to be considered as an exemplification of the principles of the invention and is not intended to limit the broad aspect of the invention to embodiments illustrated. As used herein, the term "present invention" is not intended to limit the scope of the claimed invention and is instead a term used to discuss exemplary embodiments of the invention for explanatory purposes only.

The present invention relates broadly to an impact mechanism for an impact hammer tool powered by electricity via an external power source (such as a wall outlet and/or generator outlet) or a battery, such as, for example, a rechargeable 18 V battery. The impact mechanism includes an impact mechanism longitudinal axis that is a perpendicular and offset relative to a tool longitudinal axis. The impact mechanism includes a hammer having a number of radially protruding impact surfaces adapted to sequentially impact an intermediate bit that is constrained to a small linear motion inside the tool housing. The intermediate bit is then adapted to impact a conventional hammer bit. The intermediate bit ensures that the hammer bit is far enough away from the impact mechanism to allow free movement while still generating enough rotational inertia to generate a large impact force. The hammer is driven by a gear carrier that is operably coupled to a motor. The hammer and the gear carrier respectively include a ball groove. In an embodiment, the ball groove of the hammer and the ball groove of the gear carrier are limited to use in one rotary direction. Unlike conventional impact mechanisms that require a continuous supply of compressed air to generate sufficient force, the present invention provides an impact mechanism powered by a rechargeable power source, such as, for example, a battery, that can provide sufficient impact force.

Figure 2:
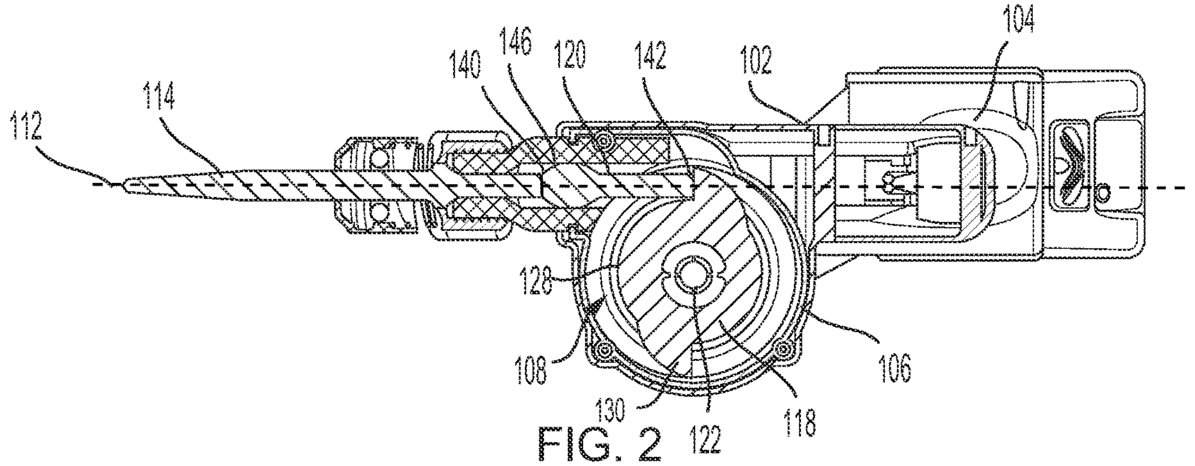
FIG. 2 is a sectional view of the hammer tool of FIG. 1 taken along line 2-2 of FIG. 2.
Figure 3:
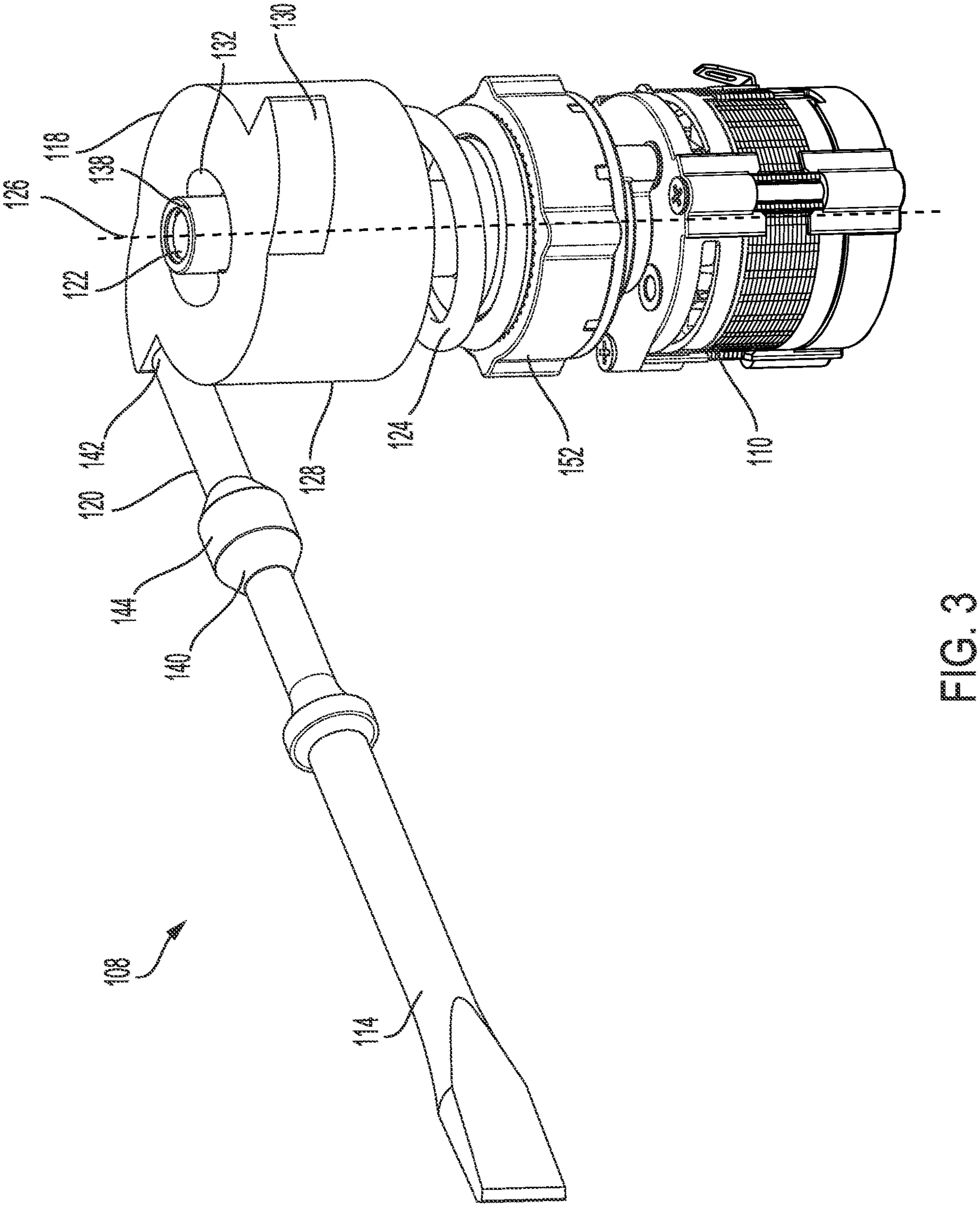
FIG. 3 is a perspective view of an impact mechanism for use with a hammer tool, according to an embodiment of the present invention.
Figure 4:
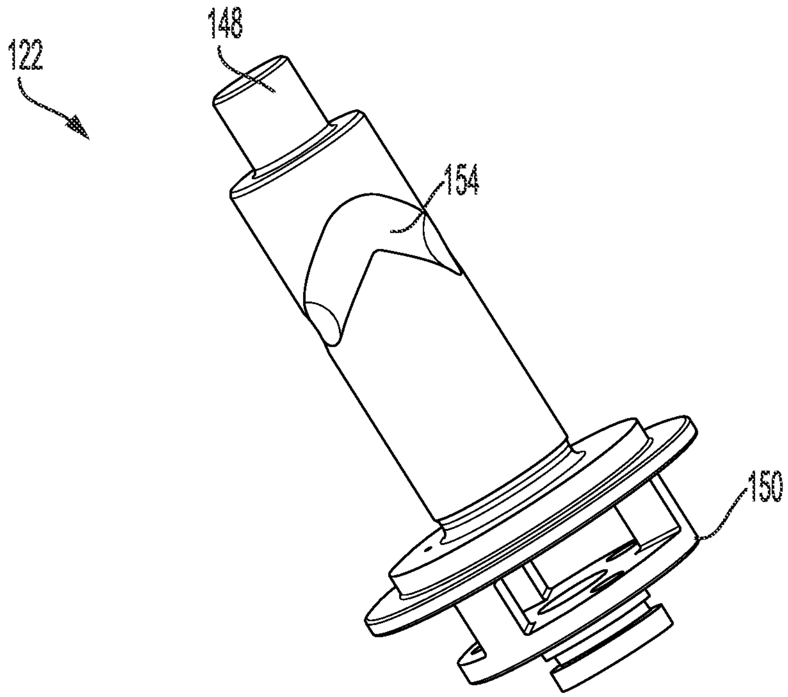
FIG. 4 is a perspective view of a gear carrier of an impact mechanism, according to an embodiment of the present invention.
Figure 5:
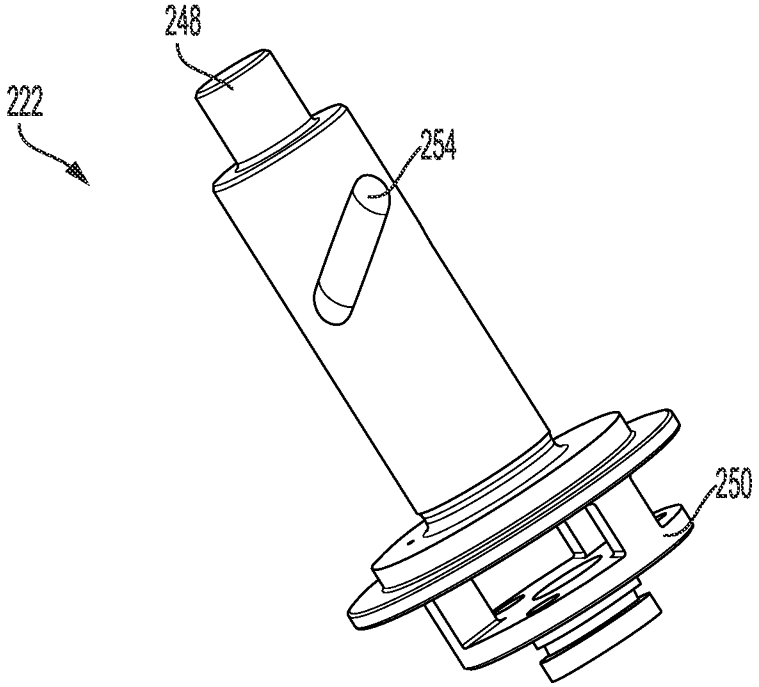
FIG. 5 is a perspective view of a gear carrier of an impact mechanism, according to another embodiment of the present invention.
Figure 6:
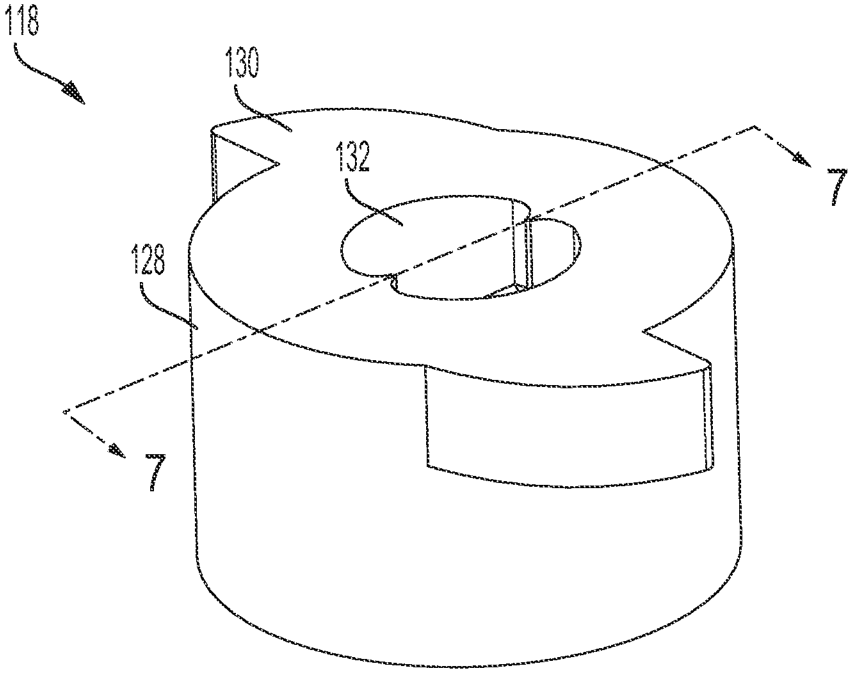
FIG. 6 is a perspective view of a hammer of an impact mechanism, according to an embodiment of the present invention.
Figure 7:
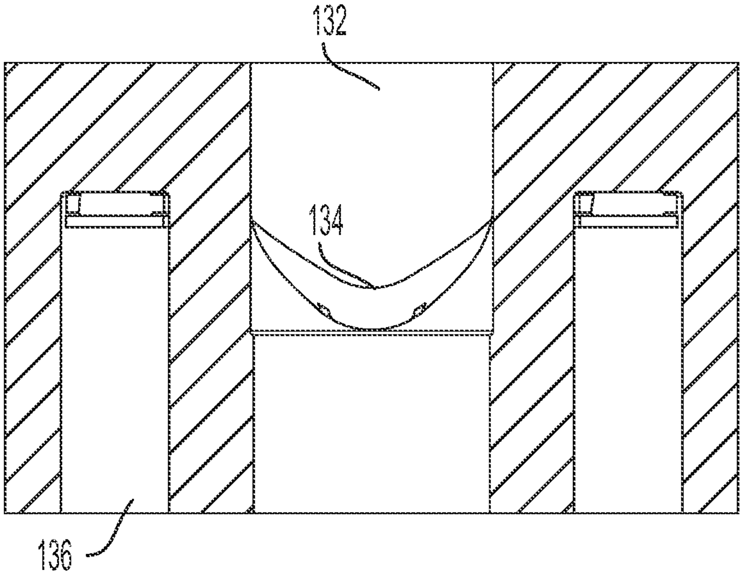
FIG. 7 is a sectional view of the hammer of FIG. 6, taken along line 7-7 of FIG. 6.
Figure 8:
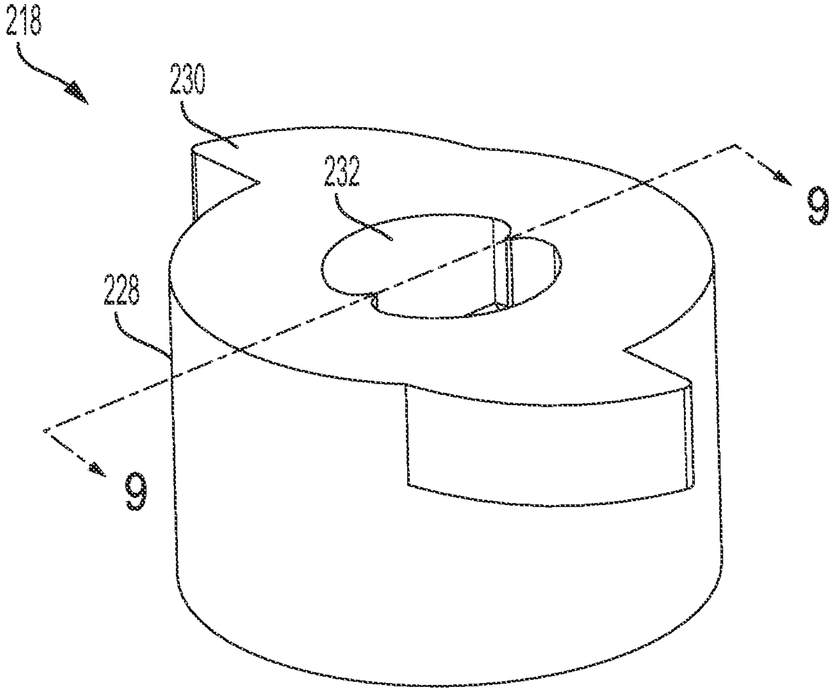
FIG. 8 is a perspective view of a hammer of an impact mechanism, according to another embodiment of the present invention.
Figure 9:
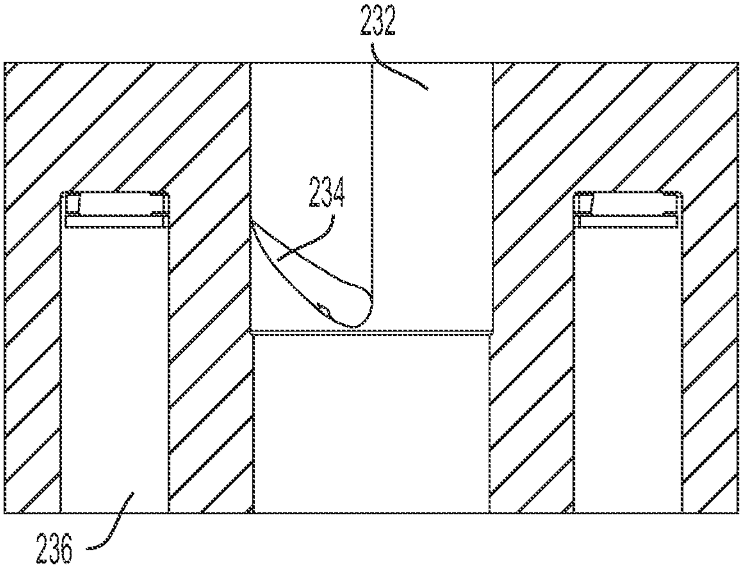
FIG. 9 is a sectional view of the hammer of FIG. 8 taken along line 9-9 of FIG. 8.

Referring to FIGS. 1-9, an impact tool 100, such as, for example, a battery powered impact hammer tool, having a housing 102 including a handle portion 104 and a motor housing portion 106. An impact mechanism 108 and motor 110 are disposed in the motor housing portion 106. The housing 102 includes a housing longitudinal axis 112. The housing 102 may include or be coupled to a tool bit 114, using well-known tool bit mechanisms, designed, for example, for chiseling, cutting, and shaping metal and/or stone, in a well-known manner, such as, for example, a chisel, cutter, scraper, punch, hammer, etc. As illustrated in FIGS. 1 and 2, a longitudinal axis of the tool bit 114 can be substantially parallel and collinear with the housing longitudinal axis 112. Alternately, the housing 102 may include a fastener holder (not shown) such that the impact mechanism can transfer impact forces to a fastener, such as, for example, a nail. In another embodiment, the housing 102 includes an additional handle (not shown) to assist a user in stabilizing the tool 100 during operation.

A trigger (not shown) for controlling operation of the impact tool 100 is disposed on the handle portion 104 in a well-known manner. Depression of the trigger causes rotation of the motor 110 in either the clockwise or counter-clockwise directions, thereby rotationally driving the impact mechanism 108 about an impact mechanism longitudinal axis 126 in one of the clockwise or counter-clockwise directions as described below. In an embodiment, the impact tool 100 is powered by a battery 116, such as a rechargeable battery, which may be detachably mountable at a battery interface of the housing 102. In an embodiment, the battery 116 is an 18 V rechargeable battery.

The impact mechanism 108 includes a hammer 118, an intermediate bit 120, a gear carrier 122, and a biasing member 124. The impact mechanism 108 transfers impact forces to the tool bit 114 when driven by the motor 110 upon actuation of the trigger, as described below. The impact mechanism longitudinal axis 126 is offset and perpendicular to the housing longitudinal axis 112.

The hammer 118 includes a radial surface 128 rotatable about the impact mechanism longitudinal axis 126 and one or more hammer lugs 130 radially extending from the radial surface 128. Although two hammer lugs 130 are shown, the invention is not limited as such and any number of suitable hammer lugs 130 may be used. The hammer 118 is slidably coupled to the gear carrier 122, which is adapted to receive rotational force from the motor 110. The hammer 118 includes a hammer aperture 132 adapted to receive the gear carrier 122. The hammer aperture 132 includes a hammer ball groove 134 adapted to receive one or more balls in a well-known manner. In an embodiment, as illustrated in the embodiment shown in FIGS. 6 and 7, the hammer ball groove 134 substantially surrounds the hammer aperture 132. In an alternate embodiment, as illustrated in the embodiment shown in FIGS. 8 and 9, the hammer ball groove 234 only partially surrounds the hammer aperture 232. Aside from the hammer ball groove 234, the hammer 218 is substantially similar as the hammer 118. The hammer 118 also includes a biasing member groove 136 adapted to receive the biasing member 124. The biasing member 124 can be, for example, a spring, and is adapted to apply bias force to axially bias the hammer 116 away from the motor 110 along the impact mechanism longitudinal axis 126. The hammer aperture 132 can also receive a bearing or bushing 138. The bearing or bushing 138 controls or limits the axial movement of the hammer 118 caused by bias force applied by the biasing member 124 to substantially align the hammer lugs 130 with the intermediate bit 120 and assists in allowing rotational movement of the hammer 118.

The intermediate bit 120 includes first 140 and second 142 opposing ends and has a longitudinal axis substantially aligned with the housing longitudinal axis 112. The intermediate bit 120 is adapted to space the hammer 118 from the tool bit 114 to ensure that the tool bit 114 is far enough away from the hammer 118 to allow free movement while also allowing the hammer 118 to have enough rotational inertia to generate a large impact force. The intermediate bit 120 is adapted to move axially within the housing 102 along the housing longitudinal axis 112 until contacting the tool bit 114 at the first end 140 in response to receiving an impact force from one of the hammer lugs 130 at the second end 142. The intermediate bit 120 further includes a radial protrusion 144. The radial protrusion 144 is sized to restrict the intermediate bit 120 from passing through a bore 146 of the housing 102 when moving in a first direction towards the tool bit 114 in response to impact force applied by the hammer 118. The bore 146 can have a conical shape that cooperatively matches a conical shape of the first end 140 of the intermediate bit 120 to limit contact stresses and provide a smaller amount of axial friction to limit rebound force of the intermediate bit 120. The radial surface 128 of the hammer 118 is sized to prevent the intermediate member 120 from passing out of the bore in a second direction away from the tool bit 114 in response to the rebound force.

During operation of the tool 100, as a user applies a force to the tool 100 against a work piece, the intermediate bit 120 is pushed inwardly and moves axially towards the hammer 118. In this case, one of the hammer lugs 130 is substantially coplanar to the second end 142 of the intermediate bit 120 when the intermediate bit 120 is positioned proximate to the radial surface 128 of the hammer 118 as the tool user is applying the force, as best illustrated in FIG. 2.

The gear carrier 122 includes first 148 and second 150 opposing ends. The first end 148 is adapted to be received by the bearing/bushing 138 and can have a diameter smaller than the rest of the gear carrier. The second end 150 of the gear carrier 122 is operably coupled to the motor 110 via gearing 152 in a well-known manner. Accordingly, the gear carrier 122 is adapted to receive rotational force from the motor 110 to rotate about the impact mechanism about the longitudinal axis 126 and transfer the rotational force to the hammer 118. In an embodiment, the gear carrier 122 can include a gear carrier ball groove 154 adapted to receive balls such that the hammer ball groove 134 and the gear carrier ball groove 154 are adapted to axially move the hammer 118 along the impact mechanism longitudinal axis 126 towards the motor 110 when a minimum torque is reached, as discussed in more detail below. In an embodiment, as illustrated in the embodiment shown in FIG. 4, the gear carrier ball groove 154 substantially surrounds the gear carrier 122 to allow the gear carrier 122 to be rotated in two rotational directions (i.e., either of clockwise and counter-clockwise directions) to cause linear movement of the hammer 118 when used with the hammer ball groove 134 in the embodiment shown in FIGS. 6 and 7. In an alternate embodiment, as illustrated in the embodiment shown in FIG. 5, the gear carrier ball groove 254 only partially surrounds the gear carrier 222 to restrict the gear carrier 122 to be rotated in one rotational direction (i.e., one of clockwise and counterclockwise directions) to cause linear movement of the hammer 218 when used with the hammer ball groove 234 in the embodiment shown in FIGS. 8 and 9. Aside from the gear carrier ball groove 254, the gear carrier 222 is substantially similar as the gear carrier 122.

During use of the impact tool 100 (i.e., when the trigger is actuated by an operator), the motor 110 rotationally drives the hammer 118 and the gear carrier 122 in either one of clockwise or counter-clockwise directions, which causes the hammer lugs 130 to sequentially contact the second end 142 of the intermediate bit 120. Once torque exceeds a minimum torque, the gear carrier 122 rotates at a faster velocity than the hammer 118, thereby causing the ball(s) to traverse along the hammer ball groove 134 and the gear carrier groove 154. As the ball(s) traverse along the hammer ball groove 134 and the gear carrier groove 154, the hammer 118 overcomes the bias force applied by the biasing member 124 and moves in an axial direction along the impact mechanism longitudinal axis 126 towards the motor 110 until the hammer lugs 130 no longer contact the intermediate bit 120. Once the hammer lugs 130 no longer contact the intermediate bit 120, the bias member 124 causes the hammer 118 to move axially along the impact mechanism longitudinal axis 126 towards the intermediate bit 120 and rotate about the impact longitudinal axis 126 to deliver a sudden rotational impact force to the second end 142 of the intermediate bit 120 and, consequently, the tool bit 114.

Accordingly, the present invention provides for an impact mechanism for a hammer tool that provides a powerful impact force without requiring compressed air. The impact mechanism can be powered by a rechargeable power source, such as, for example, a battery, while still providing sufficient impact force to chisel, cut, and shape metal and/or stone.

As used herein, the term “coupled” and its functional equivalents are not intended to necessarily be limited to direct, mechanical coupling of two or more components. Instead, the term “coupled” and its functional equivalents are intended to mean any direct or indirect mechanical, electrical, or chemical connection between two or more objects, features, work pieces, and/or environmental matter. “Coupled” is also intended to mean, in some examples, one object being integral with another object.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors’ contribution. The actual scope of the protection sought is intended to be defined in the following claims when viewed in their proper perspective based on the prior art.

What is claimed is:

1. An impact hammer tool, comprising:
- a housing having a bore extending in a first direction;
- a motor disposed in the housing and having a motor axis that is substantially perpendicular to the first direction;
- a tool bit operably coupled to and extending from the housing;
- a hammer operably coupled to the motor; and
- an intermediate bit slidably disposed in the bore and adapted to receive an impact force from the hammer when the motor is operated and impact the tool bit.

2. The impact hammer tool of claim 1, wherein the housing further includes a battery interface and the motor is adapted to be powered by a rechargeable battery removably coupled to the battery interface.

3. The impact hammer tool of claim 1, wherein the intermediate bit includes a radial protrusion adapted to restrict the intermediate bit from moving out of the bore in a direction towards the tool bit.

4. The impact hammer tool of claim 1, wherein the housing has a housing longitudinal axis and the intermediate bit has a bit longitudinal axis substantially aligned with the housing longitudinal axis, and the intermediate bit is adapted to move axially along the housing longitudinal axis.

5. The impact hammer tool of claim 1, wherein the hammer has a radial surface with hammer lugs.

6. The impact hammer tool of claim 5, wherein the hammer is adapted to rotate when the motor is operated and the intermediate bit is adapted to receive the impact force from the hammer lug and transfer the impact force to the tool bit.

7. The impact hammer tool of claim 6, further comprising a gear carrier operably coupled to and adapted to be driven by the motor.

8. The impact hammer tool of claim 7, wherein the gear carrier includes a gear carrier ball groove adapted to receive a ball and the hammer includes a hammer ball groove disposed in a hammer aperture that is adapted to receive the ball.

9. The impact hammer tool of claim 8, further comprising a biasing member adapted to bias the hammer away from the motor.

10. The impact hammer tool of claim 1, wherein the tool bit is a chisel bit, a cutter bit, a scraper bit, a punch bit, or a hammer bit.

11. An impact hammer tool, comprising:

a housing having a bore extending in a first direction;

a motor disposed in the housing;

a tool bit operably coupled to and extending from the housing; and an impact mechanism operably coupled to the motor and having an impact mechanism longitudinal axis that is substantially perpendicular to the first direction, wherein the impact mechanism includes an intermediate bit having opposing first and second ends, and the first end has a conical type shape, wherein the intermediate bit is slidably disposed in the bore and the first end is adapted to apply an impact force to the tool bit when the motor is operated, and wherein the bore has a shape that cooperatively matches the conical type shape of the first end.

12. The impact hammer tool of claim 11, wherein the housing further includes a battery interface and the motor is adapted to be powered by a rechargeable battery removably coupled to the battery interface.

13. The impact hammer tool of claim 11, wherein the intermediate bit includes a radial protrusion adapted to restrict the intermediate bit from moving out of the bore in a direction towards the tool bit.

14. The impact hammer tool of claim 11, wherein the housing has a housing longitudinal axis and the intermediate bit has a bit longitudinal axis substantially aligned with the housing longitudinal axis, and the intermediate bit is adapted to move axially along the housing longitudinal axis.

15. The impact hammer tool of claim 11, wherein the impact mechanism includes a hammer that is adapted to rotate about the impact mechanism longitudinal axis when the motor is operated, and the intermediate bit is adapted to receive the impact force from the hammer and transfer the impact force to the tool bit.

16. The impact hammer tool of claim 11, wherein the tool bit is a chisel bit, a cutter bit, a scraper bit, a punch bit, or a hammer bit.

* * * * *